(12) United States Patent
Pauker et al.

(10) Patent No.: US 8,855,296 B2
(45) Date of Patent: Oct. 7, 2014

(54) DATA PROCESSING SYSTEMS WITH FORMAT-PRESERVING ENCRYPTION AND DECRYPTION ENGINES

(75) Inventors: Matthew J. Pauker, San Francisco, CA (US); Terence Spies, Mountain View, CA (US); Luther W. Martin, San Jose, CA (US)

(73) Assignee: Voltage Security, Inc., Cupertino, CA (US)

( * ) Notice: Subject to any disclaimer, the term of this patent is extended or adjusted under 35 U.S.C. 154(b) by 920 days.

(21) Appl. No.: 12/967,008

(22) Filed: Dec. 13, 2010

(65) Prior Publication Data

US 2014/0108813 A1      Apr. 17, 2014

Related U.S. Application Data

(63) Continuation of application No. 11/635,756, filed on Dec. 6, 2006, now Pat. No. 7,864,952.

(60) Provisional application No. 60/817,261, filed on Jun. 28, 2006.

(51) Int. Cl.
*G06F 21/00* (2013.01)
*G06F 21/60* (2013.01)

(52) U.S. Cl.
CPC ................................. *G06F 21/602* (2013.01)
USPC ...... 380/28; 726/6; 726/7; 713/168; 713/189; 380/44; 380/45; 380/277

(58) Field of Classification Search
CPC ........................................................ H04L 9/28
USPC ................................................ 380/28–29, 44
See application file for complete search history.

(56) References Cited

U.S. PATENT DOCUMENTS 5,727,065 A    3/1998  Dillon
5,784,461 A    7/1998  Shaffer et al.
(Continued)

FOREIGN PATENT DOCUMENTS

EP    1 209 550    5/2002
WO    0251066      6/2002
(Continued)

OTHER PUBLICATIONS

Liskov, Moses et al. "Tweakable Block Ciphers" CRYPTO 2002 [online] [retrieved on Jun. 29, 2010]: <URL:http://www.cs.wm.edu/~mliskov/pubs/liriwa053102.pdf>.

(Continued)

*Primary Examiner* — Morshed Mehedi
(74) *Attorney, Agent, or Firm* — Treyz Law Group; G. Victor Treyz; Michael H. Lyons

(57) ABSTRACT

A data processing system is provided that includes format-preserving encryption and decryption engines. A string that contains characters has a specified format. The format defines a legal set of character values for each character position in the string. During encryption operations with the encryption engine, a string is processed to remove extraneous characters and to encode the string using an index. The processed string is encrypted using a format-preserving block cipher. The output of the block cipher is post-processed to produce an encrypted string having the same specified format as the original unencrypted string. During decryption operations, the decryption engine uses the format-preserving block cipher in reverse to transform the encrypted string into a decrypted string having the same format.

12 Claims, 11 Drawing Sheets

(56) References Cited

U.S. PATENT DOCUMENTS

| | | | |
|---|---|---|---|
| 6,230,269 | B1 | 5/2001 | Spies et al. |
| 6,263,439 | B1 | 7/2001 | Hondros |
| 6,289,450 | B1 | 9/2001 | Pensak et al. |
| 6,836,765 | B1 | 12/2004 | Sussman |
| 6,885,748 | B1 * | 4/2005 | Wang ............................ 380/201 |
| 7,337,176 | B1 | 2/2008 | Cheedella et al. |
| 7,353,388 | B1 | 4/2008 | Gilman et al. |
| 7,401,232 | B2 | 7/2008 | Ono et al. |
| 7,412,519 | B2 | 8/2008 | Wang |
| 7,418,098 | B1 * | 8/2008 | Mattsson et al. ................ 380/28 |
| 7,522,723 | B1 | 4/2009 | Shalk |
| 7,624,269 | B2 | 11/2009 | Appenzeller et al. |
| 7,657,037 | B2 | 2/2010 | Callas |
| 7,864,952 | B2 | 1/2011 | Pauker |
| 8,208,627 | B2 | 6/2012 | Pauker |
| 2002/0073202 | A1 | 6/2002 | Wang |
| 2003/0028481 | A1 * | 2/2003 | Flitcroft et al. ................ 705/39 |
| 2003/0191719 | A1 | 10/2003 | Ginter et al. |
| 2005/0132070 | A1 | 6/2005 | Redlich et al. |
| 2005/0262573 | A1 | 11/2005 | Bo et al. |
| 2006/0059149 | A1 | 3/2006 | Dunki et al. |
| 2008/0170693 | A1 * | 7/2008 | Spies et al. .................... 380/277 |
| 2009/0310778 | A1 * | 12/2009 | Mueller et al. .................. 380/44 |
| 2010/0111297 | A1 * | 5/2010 | Pauker et al. .................... 380/37 |
| 2010/0284532 | A1 * | 11/2010 | Burnett et al. .................. 380/28 |

FOREIGN PATENT DOCUMENTS

| | | |
|---|---|---|
| WO | 03001326 | 10/2003 |
| WO | 2006/107777 | 10/2006 |

OTHER PUBLICATIONS

Martin, Luther W. et al. U.S. Appl. No. 12/610,221, filed Oct. 30, 2009.

Thomas Stutz and Andreas Uhl, "On Format-Compliant Iterative Encryption of JPEG2000," Proceedings of the Eighth IEEE International Symposium on Multimedia (ISM '06), 2006.

J. Black and P. Rogaway, "Ciphers with Arbitrary Finite Domains," [online]. Feb. 12, 2001 <URL:eprint.iacr.org/2001/012.ps>.

Pauker, Matthew J. U.S. Appl. No. 12/432,258, filed Apr. 29, 2009.

Burnett, Steven D. U.S. Appl. No. 12/435,635, filed May 5, 2009.

Spies, Terence et al., U.S. Appl. No. 11/654,054, filed Jan. 16, 2007.

Brightwell, M et al. "Using Datatype-Preserving Encryption to Enhance Data Warehouse Security", 20th National Information Systems Security Conference, Oct. 7-10, 1997—Baltimore, Maryland.

Black, J. et al. "Ciphers with Arbitrary Finite Domains", RSA Conference 2002, San Jose, CA, USA, Feb. 18-22, 2002, Proceedings, Lecture Notes in Computer Science, 2271 Springer 2002, ISBN 3-540-43224, pp. 114-130.

U.S. Department of Commerce/National Institute of Standards and Technology, "Data Encryption Standard (DES)", Oct. 25, 1999, Federal Information Processing Standards Publication.

Naor et al. "On the Construction of Pseudorandom Permutations: Luby-Rackoff Revisited". Journal of Cryptology, vol. 12, Issue 1, pp. 29-66. Jan. 1999.

T. Lookabaugh; Security analysis of selectively encrypted MPEG-2 streams; Tear 2003; colorado.edu; pp. 1-12.

* cited by examiner

| CUSTOMER NAME | ADDRESS | CREDIT CARD NO. | SOCIAL SECURITY NO. |
|---|---|---|---|
| CUSTOMER1 | ADDRESS1 | CCNUMBER1 | SSN1 |
| CUSTOMER2 | ADDRESS2 | CCNUMBER2 | SSN2 |
| CUSTOMER3 | ADDRESS3 | CCNUMBER3 | SSN3 |
| ... | ... | ... | ... |

DATA PROCESSING SYSTEMS WITH FORMAT-PRESERVING ENCRYPTION AND DECRYPTION ENGINES

This patent application claims the benefit of provisional patent application No. 60/817,261, filed Jun. 28, 2006 and patent application Ser. No. 11/635,756 filed Dec. 6, 2006 which are hereby incorporated by reference herein in their entireties.

BACKGROUND OF THE INVENTION

This invention relates to cryptography and more particularly, to encryption and decryption engines in which data formats are preserved during encryption and decryption operations.

Cryptographic systems are used to secure data in a variety of contexts. For example, encryption algorithms are used to encrypt sensitive information such as financial account numbers, social security numbers, and other personal information. By encrypting sensitive data prior to transmission over a communications network, the sensitive data is secured, even if it passes over an unsecured communications channel. Sensitive data is also sometimes encrypted prior to storage in a database. This helps to prevent unauthorized access to the sensitive data from an intruder.

Commonly used encryption algorithms include the Advanced Encryption Standard (AES) encryption algorithm and the Data Encryption Standard (DES) encryption algorithm. Using these types of algorithms, an organization that desires to secure a large quantity of sensitive information can place the sensitive information in a data file. The data file can then be encrypted in its entirety using the AES or DES algorithms.

Encrypting entire files of data can be an effective technique for securing large quantities of data. However, bulk encryption of files can be inefficient and cumbersome, because it is not possible to selectively access a portion of the encrypted data in an encrypted file. Even if an application only needs to have access to a portion of the data, the entire file must be decrypted, as it is not possible to decrypt only that portion of the encrypted file. Without the ability to selectively decrypt part of a file, it can be difficult to design a data processing system that provides different levels of data access for different application programs and for different personnel.

To avoid the difficulties associated with encrypting entire files of sensitive data, it would be desirable to be able to apply cryptographic techniques such as the AES and DES encryption algorithms with a finer degree of granularity. For example, it might be desirable to individually encrypt social security numbers in a database table, rather than encrypting the entire table. This would allow software applications that need to access insensitive information in the table to retrieve the desired information without decrypting the entire table.

Conventional encryption techniques can, however, significantly alter the format of a data item. For example, encryption of a numeric string such as a social security number may produce a string that contains non-numeric characters or a string with a different number of characters. Because the format of the string is altered by the encryption process, it may not be possible to store the encrypted string in the same type of database table that is used to store unencrypted versions of the string. The altered format of the encrypted string may therefore disrupt software applications that need to access the string from a database. The altered format may also create problems when passing the encrypted string between applications. Because of these compatibility problems, organizations may be unable to incorporate cryptographic capabilities into legacy data processing systems.

It would therefore be desirable to be able to provide cryptographic tools that are capable of encrypting and decrypting data without altering the format of the data.

SUMMARY OF THE INVENTION

In accordance with the present invention, a data processing system is provided that includes applications and databases. The applications and databases handle sensitive data. The sensitive data includes data strings containing characters. Format-preserving encryption and decryption engines are used to encrypt and decrypt the data strings without altering their format.

The format of a data string specifies a legal set of characters for each character position in the data string. During encryption operations with the encryption engine, data strings are processed to remove extraneous characters (e.g., to remove non-digit characters in a string where the relevant characters are composed of digits). For example, a credit card number may be processed to remove extraneous spaces and to remove the credit card's checksum digit. The resulting processed data string is encoded using an index. The index maps sequential indices to the characters in the legal set of character values for each character in the data string.

The processed and encoded data string is encrypted using a format-preserving block cipher. The format-preserving block cipher uses a subkey generation algorithm such as a subkey generation algorithm based on a cryptographic hash function and uses a format-preserving combining algorithm such as addition or multiplication modulo x, where x is an appropriately-sized integer.

The output of the block cipher is post-processed to ensure that the format of the encrypted version of the data string matches the format of the original unencrypted version of the data string. During postprocessing, the index that was used to encode the unencrypted data string is used to decode the encrypted data string. The decoded data string contains only characters that are in the legal set of characters for each character position in the data string. The decoded data string is processed to restore elements that were removed before encryption. For example, if spaces and a checksum were removed from the original string, these items can be restored. If a checksum value is being added to the encrypted data string, a new valid checksum may be calculated based on the characters in the encrypted string or a dummy (invalid) checksum value may be added. Processing the string to restore removed elements ensures that the final encrypted version of the data string will have the same format as the original unencrypted string.

Further features of the invention, its nature and various advantages will be more apparent from the accompanying drawings and the following detailed description of the preferred embodiments.

BRIEF DESCRIPTION OF THE DRAWINGS

FIG. 3 is a diagram of an illustrative database table showing sensitive data strings that may be individually encrypted while preserving their format in accordance with the present invention.

FIGS. 13 and 14 show illustrative mappings that may be used to relate potential character values in a given string position to corresponding index values in an associated index in accordance with the present invention.

DETAILED DESCRIPTION OF THE PREFERRED EMBODIMENTS

Figure 1:
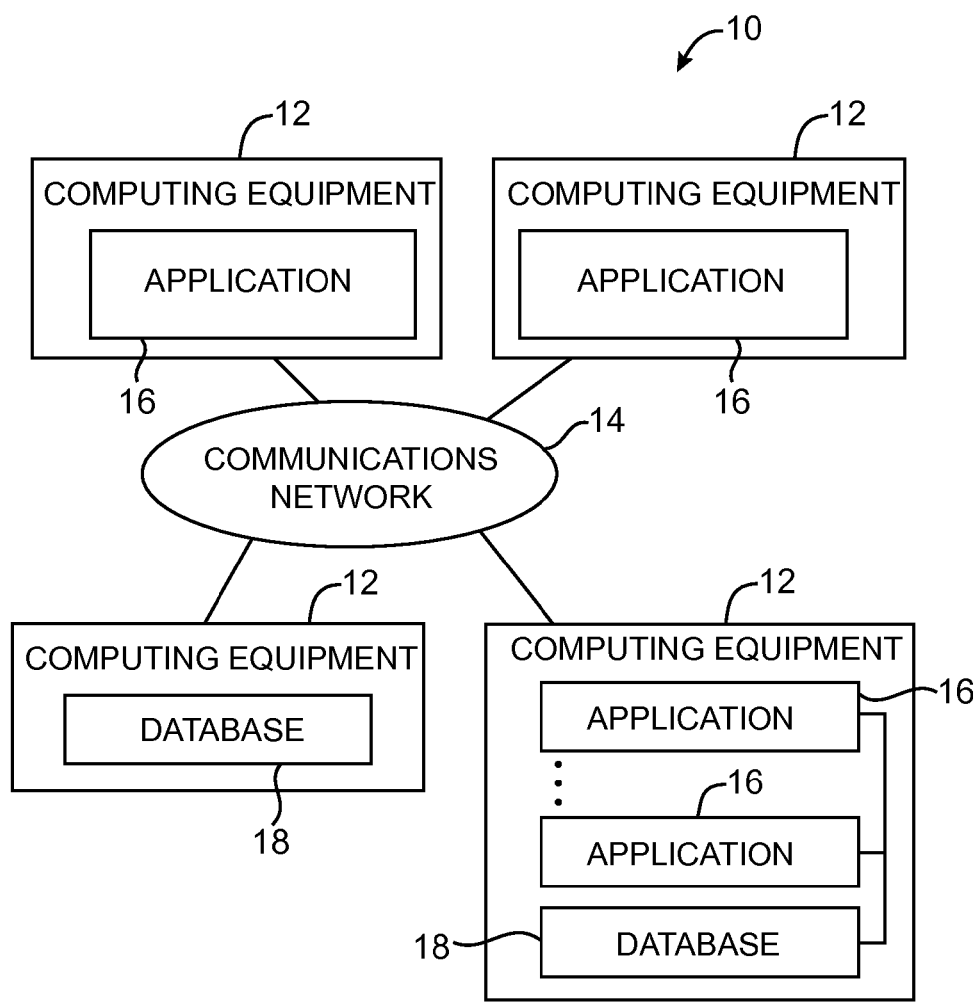
FIG. 1 is a diagram of an illustrative system environment in which cryptographic tools with format-preserving encryption and decryption may be used in accordance with the present invention.

An illustrative cryptographic system 10 in accordance with the present invention is shown in FIG. 1. System 10 includes computing equipment 12 and communications network 14. The computing equipment 12 may include one or more personal computers, workstations, computers configured as servers, mainframe computers, portable computers, etc. The communications network 14 may be a local area network or a wide area network such as the internet. System 10 may be used in processing data for one or more organizations.

Computing equipment 12 may be used to support applications 16 and databases 18. In computing equipment 12 in which multiple applications run on the same computer platform, applications and databases may communicate with each other directly. If desired, applications 16 can communicate with each other and with databases 18 remotely using communications network 14. For example, an application 16 that is run on a computer in one country may access a database 18 that is located in another country or an application 16 running on one computer may use network 14 to transmit data to an application 16 that is running on another computer. Applications 16 may be any suitable applications, such as financial services applications, governmental record management applications, etc.

The data that is handled by system 10 includes sensitive items such as individuals' addresses, social security numbers and other identification numbers, license plate numbers, passport numbers, financial account numbers such as credit card and bank account numbers, telephone numbers, email addresses, etc. In some contexts, information such as individuals' names may be considered sensitive.

In a typical scenario, a credit card company maintains a database 18 of account holders. The database lists each account holder's name, address, credit card number, and other account information. Representatives of the credit card company may be located in many different geographic locations. The representatives may use various applications 16 to access the database. For example, a sales associate may retrieve telephone numbers of account holders to make sales calls using one application, whereas a customer service representative may retrieve account balance information using another application. Automated applications such as error-checking housekeeping applications may also require access to the database.

To prevent unauthorized access to sensitive data and to comply with data privacy regulations and other restrictions, sensitive data may need to be encrypted. Encryption operations may be performed before data is passed between applications 16 or before data is stored in a database 18. Because various applications may need to access different types of data, the system 10 preferably allows data to be selectively encrypted. As an example, each of the telephone numbers and each of the credit card numbers can be individually encrypted using separate cryptographic keys. With this type of selective encryption arrangement, applications that require access to telephone numbers need not be provided with access to credit card numbers and vice versa.

To support encryption and decryption operations in system 10 applications 16 may be provided with encryption and decryption engines. For example, an application 16 that accesses a database 18 over a communications network 14 may have an encryption engine for encrypting sensitive data before it is provided to the database 18 and stored and may have a decryption engine for use in decrypting encrypted data that has been retrieved from database 18 over communications network 14. As another example, a first application may have an encryption engine for encrypting sensitive data before passing the encrypted data to a second application. The second application may have a decryption engine for decrypting the encrypted data that has been received from the first application.

Any suitable technique may be used to provide applications 16 with encryption and decryption capabilities. For example, the encryption and decryption engines may be incorporated into the software code of the applications 16, may be provided as stand-alone applications that are invoked from within a calling application, or may be implemented using a distributed arrangement in which engine components are distributed across multiple applications and/or locations.

Figure 2:
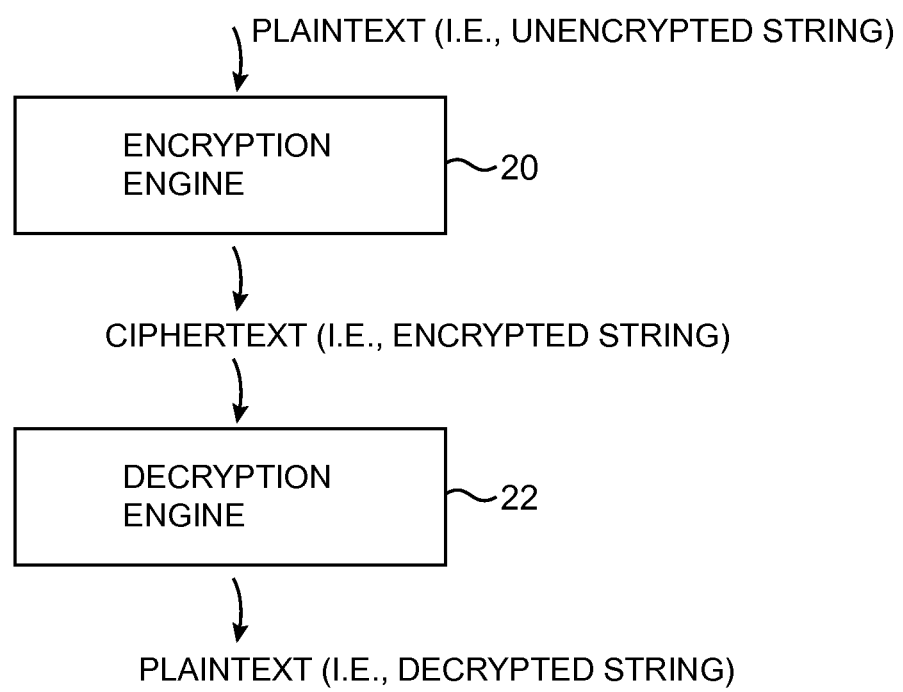
FIG. 2 is a diagram showing how encryption and decryption engines preserve the format of a string in accordance with the present invention.

The data handled by the applications 16 and databases 18 of system 10 is represented digitally. The data includes strings of characters (i.e., names, addresses, account numbers, etc.). As shown in FIG. 2, during encryption operations, an encryption engine 20 encrypts unencrypted strings of characters (sometimes referred to as plaintext) into encrypted strings of characters (sometimes referred to as ciphertext). During decryption operations, a decryption engine 22 decrypts encrypted strings of characters to form unencrypted strings of characters.

The data strings that are handled in a typical data processing system have defined formats. For example, an identification number may be made up of a letter followed by two digits. The encryption and decryption engines of the present invention are able to encrypt and decrypt strings without changing a string's format. The ability to preserve the format of a data string greatly simplifies system operations and allows systems with legacy applications to be provided with cryptographic capabilities that would not be possible using conventional techniques.

Consider, as an example, a scenario in which a credit card company maintains a database of credit card data for its customers. An illustrative database table 24 that might be associated with this type of database is shown in FIG. 3. As shown in FIG. 3, table 24 has four columns. The first column is used to store customer names. The second column of table 24 is used to store corresponding customer addresses. The third column and fourth column are used to store credit card numbers and social security card numbers, respectively. Each row of table 24 corresponds to a different customer. An application that desires to retrieve the social security number of the fourth customer in table (as an example), retrieves the social security number from the social security number field that is associated with the fourth row of table 24.

Each data field in table 24 adheres to a prescribed format. The customer name field may contain 20 characters. Valid characters in the customer name field may be restricted to uppercase and lowercase letters and certain punctuation characters. The address field may contain 100 characters. Valid address field characters may be restricted to uppercase and lowercase letters, numbers, and certain punctuation characters. The credit card field in table 24 may contain 16 digits organized as four groups of four digits each. The last of the credit card digits is a checksum value that is computed using the initial 15 digits of the card number. Three spaces may be used to separate the four-digit groups. The social security number field requires strings of nine digits. The digits may be restricted to certain ranges and be separated by dashes.

Because the fields of table 24 and the applications that interact with table 24 require strings of a particular format, care must be taken not to alter the format of a string during encryption and decryption operations. For example, because only digits (and spaces) are used in credit card field, a credit card string that contains a letter would be invalid. If an encryption operation is performed on a credit card number that causes the encrypted version of the credit card number to contain letters, the required credit card number format will not be preserved.

Figure 4:
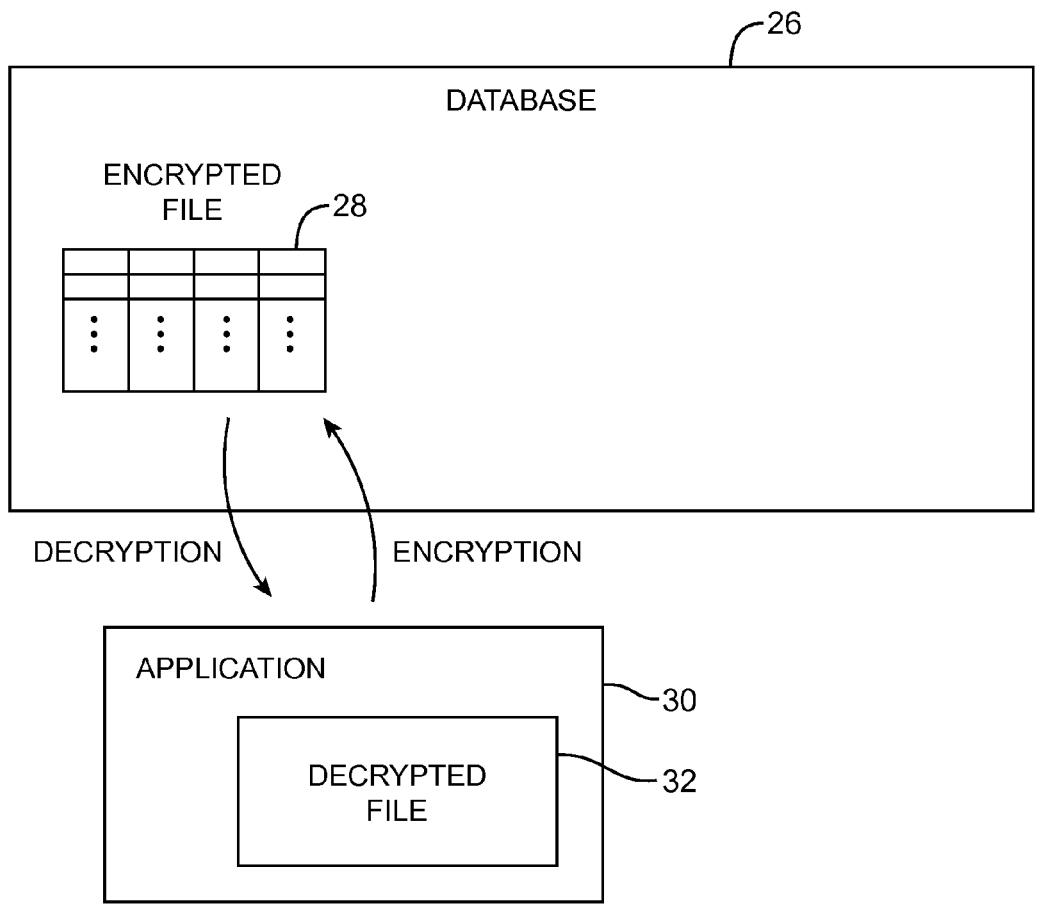
FIG. 4 is a diagram showing how conventional databases sometimes use file-based encryption to protect sensitive data.

One conventional approach for addressing this problem is to maintain a database table in a file. The data in the table is then secured by encrypting the entire file. This type of approach is shown in FIG. 4. As shown in FIG. 4, a database 26 contains a table that has been stored as a file 28. The entire file is encrypted, so that the table can be securely maintained in database 26. When an application such as application 30 desires to access information in the database table, the encrypted file 28 is retrieved and decrypted in its entirety. The decrypted file 32 is used by the application. Data that is added to the database can be stored in the decrypted file 32. When it is desired to store the contents of the file 32 in database 26, the entire file 32 is encrypted.

Conventional arrangements of the type shown in FIG. 4 are inefficient, because an entire file must be encrypted and decrypted, even if an application only needs access to a small portion of a database table. Moreover, this type of approach makes is difficult or impossible for different applications to be provided with access to different subsets of the database table contents. This can pose a security risk, because sensitive data is not released on a need-to-know basis.

To address this problem, it might be desirable to use a conventional encryption algorithm such as the Advanced Encryption Standard (AES) encryption algorithm or the Data Encryption Standard (DES) encryption algorithm to encrypt a database table at a finer level of granularity. However, conventional encryption algorithms such as the AES and DES algorithms do not ensure that the format of data string will be preserved during encryption, which can make it difficult or impossible to use such encryption algorithms in a system.

Figure 5:
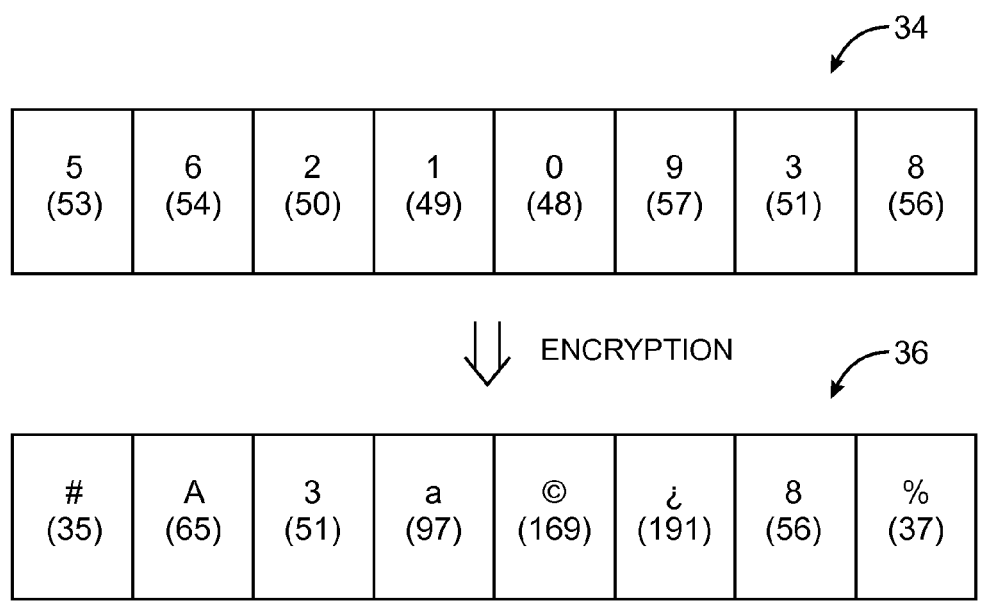
FIG. 5 is a diagram showing how conventional encryption schemes do not preserve the format of a data string when the data string is encrypted.

As an example, consider the scenario shown in FIG. 5. In the scenario of FIG. 5, an eight-digit unencrypted data string 34 is being encrypted using a conventional encryption algorithm such as the AES or DES algorithm to produce a corresponding encrypted data string 36. Each character in the data strings is represented by an eight-bit code (byte). The code values corresponding to each character are shown in parentheses. For example, the eight-bit code for the digit "5" is 53, the eight-bit code for the digit "0" is 48, and the eight-bit code for the digit "9" is 57.

During application of a conventional encryption algorithm such as the AES or DES algorithm, the digital codes for each character in the unencrypted string 34 are transformed by the encryption process into new values in the encrypted string 36. In the example of FIG. 5, the code 53 for the first element of string 34 is transformed into the code 35 for the first element of string 36, the code 54 for the second element of string 34 corresponds to the code 65 in the second character position of string 36, etc.

The format for the original string (unencrypted string 34) in the example of FIG. 5 is an eight-character string containing only digits. The eight-bit codes for each character range between 48 (for the digit "0") and 57 (for the digit "9"). During encryption, the AES or DES algorithm does not preserve this code range, but rather produces code values that fall within the entire available 8-bit code range (i.e., between 0 and 255). As a result, the encrypted string contains non-digit characters such as letters and symbols. For example, the code 35 that is produced for the first character of encrypted string 36 corresponds to the # symbol, the code 65 for the second character in string 36 corresponds to the letter A, etc. As this example demonstrates, conventional encryption algorithms do not preserve the format of a string.

Another reason that conventional encryption algorithms such as AES and DES do not preserve string formats during encryption is that the output of such algorithms is typically fixed at eight or sixteen bytes in length, regardless of input size. This changes the format of any string that does not contain exactly eight or sixteen bytes. As an example, consider a string that contains seven characters represented by seven corresponding bytes of data. During encryption using a conventional DES algorithm, an eight-byte ciphertext result is produced from the seven plaintext bytes in the string. Because the number of bytes in the ciphertext does not match the number of bytes in the plaintext, the format of the string is not preserved during encryption.

Because conventional encryption algorithms alter the format of a string during encryption, it may be difficult or impossible to use the encrypted version of the string. For example, it may be impossible to store string 36 in a database table that has been designed to handle strings that contain only digits such as string 34. As a result, conventional encryption algorithms often cannot be used to secure data unless a cumbersome file-based encryption scheme of the type described in connection with FIG. 4 is used.

Figure 6:
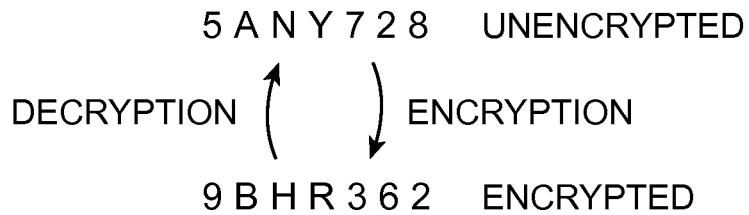
FIG. 6 is a diagram showing how the format of a license plate number can be preserved when the license plate number is encrypted and decrypted using a format-preserving encryption engine and a format-preserving decryption engine in accordance with the present invention.
Figure 7:
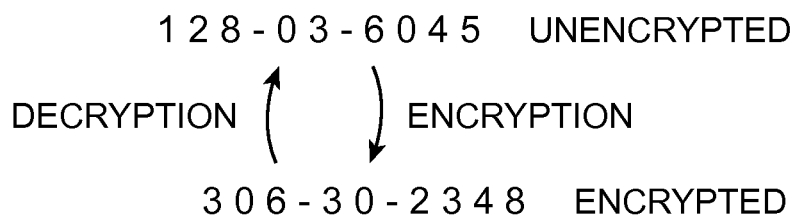
FIG. 7 is a diagram showing how the format of a social security number can be preserved when the social security number is encrypted and decrypted using a format-preserving encryption engine and a format-preserving decryption engine in accordance with the present invention.
Figure 8:
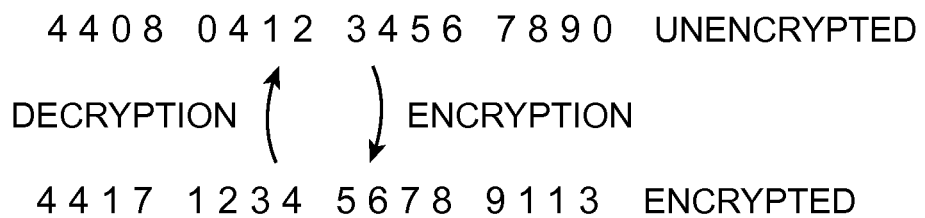
FIG. 8 is a diagram showing how the format of a credit card number can be preserved when the credit card number is encrypted and decrypted using a format-preserving encryption engine and a format-preserving decryption engine in accordance with the present invention.

In accordance with the present invention, data stings can be encrypted and decrypted while preserving the format of the strings. FIGS. 6, 7, and 8 show examples of format-preserving encryption and decryption operations that may be performed by format-preserving encryption and decryption engines 20 and 22.

The example of FIG. 8 involves encryption and decryption of a license plate number. The format for a valid license plate number (in this example) requires that the license plate number be formed from seven characters. The first and last three characters are digits. The remaining characters in the string are uppercase letters. As shown in FIG. 6, during encryption operations the unencrypted license plate number "5ANY728" is encrypted to form the corresponding encrypted license plate number "9BHR362". Both the encrypted and unencrypted versions of the license plate number conform to the license plate numbering format.

The example of FIG. 7 involves encryption and decryption of a social security number. The format for a valid social security number requires that the social security number be formed from nine digits. The first three and last four of the digits may be separated from two of the middle digits by dash characters. In the example of FIG. 7, the unencrypted social security number "128-03-6045" is encrypted to form the corresponding encrypted social-security number "306-30-2348". Decrypting the number "306-30-2348" produces the corresponding unencrypted social security number "128-03-6045". Both the encrypted and unencrypted versions of the social security number contain nine digits, as required by the social security number formatting specifications.

The example of FIG. 8 involves encryption and decryption of a credit card number. The format for a valid credit card number requires that the credit card number have 16 digits. The digits are typically organized in four groups of four each, separated by three spaces. In the example of FIG. 8, the unencrypted credit card number "4408 0412 3456 7890" is transformed into the credit card number "4417 1234 5678 9113" during the encryption process. During decryption, the credit card number "4417 1234 5678 9113" is transformed back into the unencrypted credit card number "4408 0412 3456 7890".

The value of the sixteenth digit in a credit card number is formed by performing a checksum operation on the first 15 digits using the so-called Luhn algorithm. Any single-digit error in the credit card number and most adjacent digit transpositions in the credit card number will alter the checksum value, so that data entry errors can be identified.

During encryption operations, the encryption engine 20 can compute a new and valid checksum value to use as the sixteenth encrypted string digit. Alternatively, the encryption engine 20 can transform 16 unencrypted digits into 16 encrypted digits without giving special attention to the sixteenth digit, which will generally result in a sixteenth digit that is an invalid checksum. If desired, the encryption engine 20 can use a dummy checksum value (e.g., a known fixed number) as the sixteenth digit of the encrypted string. The choice of which of these techniques is used by the encryption engine 20 may be made based on the requirements of the applications that use the credit card number. For example, if a housekeeping application periodically checks the stored credit card numbers in a database table for their validity using the Luhn algorithm, it may be desirable for the encryption engine 20 to incorporate a valid checksum value into the encrypted credit card number string. If, on the other hand, the desired format for the credit card simply requires that the number have 16 digits, the encryption engine 20 need not ensure that the sixteenth character in the encrypted credit card number forms a valid checksum.

As the examples of FIGS. 6, 7, and 8 demonstrate, encryption and decryption engines 20 and 22 can preserve a desired format for a string during encryption and decryption operations. This allows sensitive data to be secured without requiring entire files to be encrypted.

The encryption and decryption engines 20 and 22 preferably use index mappings to relate possible character values in a given string position to corresponding index values in an index. By mapping string characters to and from a corresponding index, the encryption and decryption engines 20 and 22 are able to perform encryption and decryption while preserving string formatting.

Figures 13, 14:
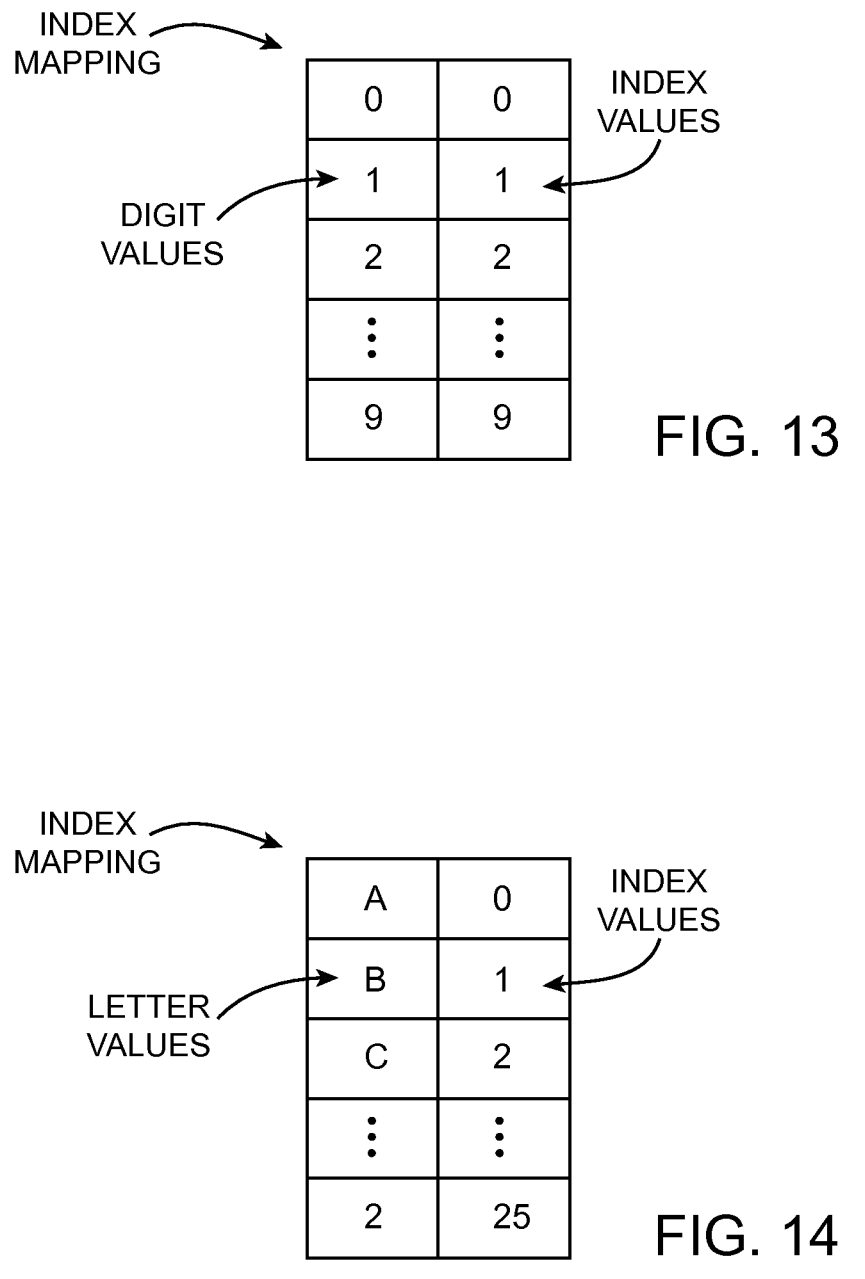

An example of two illustrative index mappings that may be used to relate character values to corresponding index values are shown in FIGS. 13 and 14. The illustrative mappings of FIGS. 13 and 14 may be used, for example, in connection with the license plate example of FIG. 6. The first column of each mapping corresponds to the potential character values in a given string position (i.e., the range of legal values for characters in that position). The second column of each mapping corresponds to an associated index. Each row in the mapping defines an association between a character value and a corresponding index value.

In the license plate example of FIG. 6, the first, fifth, sixth, and seventh string characters are digits and the second, third, and fourth characters are uppercase letters. The possible character values in the first, fifth, sixth, and seventh character positions within the plaintext version of the license plate string range from 0 to 9 (i.e., the first character in the string may be any digit from 0 through 9, the fifth character in the string may be any digit from 0 to 9, etc.). The possible character values in the second, third, and fourth positions in the string range from A to Z (i.e., the second character in the unencrypted version of the string may be any uppercase letter in the alphabet from A to Z, the third character in the unencrypted version of the string may be any uppercase letter from A through Z, etc.).

The index mapping of FIG. 13 shows how ten possible digit values may be mapped to ten corresponding index values. An index mapping of the type shown in FIG. 13 may be used for the first, fifth, sixth, and seventh string characters. The index mapping of FIG. 14 shows how 26 possible uppercase letter values (A . . . Z) may be mapped to 26 corresponding index values (0 . . . 25). The index mapping of FIG. 14 may be used for the second, third, and fourth characters in the license plate string.

In a typical string, not all characters have the same range of potential character values. If there are two ranges of potential character values, two index mappings may be used, each of which maps a different set of possible character values to a different set of index values. If there are three ranges of potential character values within the string, three index mappings may be used. For example, a first index mapping may relate a digit character to a first index, a second index mapping may relate a uppercase letter character to a second index, and a third index mapping may relate an alphanumeric character to a third index. In the license plate example of FIG. 6, there are two distinct types of characters (digits and uppercase letters), so there are two index mappings (FIGS. 13 and 14). In strings that contain a larger number of different character types, more index mappings may be used.

In general, a string contains a number of characters N. The potential character values in the string are related to corresponding index values using index mappings. An index mapping is created for each character. The indexes used to represent each character may have any suitable size. For example, an index containing 52 index values may be associated with string characters with character values that span both the uppercase and lowercase letters. Because not all of the characters typically have the same range of potential character values, there are generally at least two different index mappings used to map character values in the string to corresponding index values. In a string with N characters, N index mappings are used, up to N of which may be different index mappings.

Any suitable cryptographic formulation may be used for the format-preserving encryption and decryption engines 20 and 22, provided that the cryptographic strength of the encryption algorithm is sufficiently strong. With one suitable approach, encryption engine 20 and decryption engine 22 use a cryptographic algorithm based on the well known Luby-Rackoff construction. The Luby-Rackoff construction is a method of using pseudo-random functions to produce a pseudo-random permutation (also sometimes referred to as a block cipher). A diagram showing how encryption engine 20 and decryption engine 22 may be implemented using the Luby-Rackoff construction is shown in FIG. 9.

During encryption operations, an unencrypted string is divided into two portions. The unencrypted string may be divided into two portions using any suitable scheme. For example, the string may be divided into odd and even portions by selecting alternating characters from the string for the odd portion and for the even portion. With another suitable approach, the unencrypted string is divided into two portions by splitting the string into left and right halves.

Figure 9:
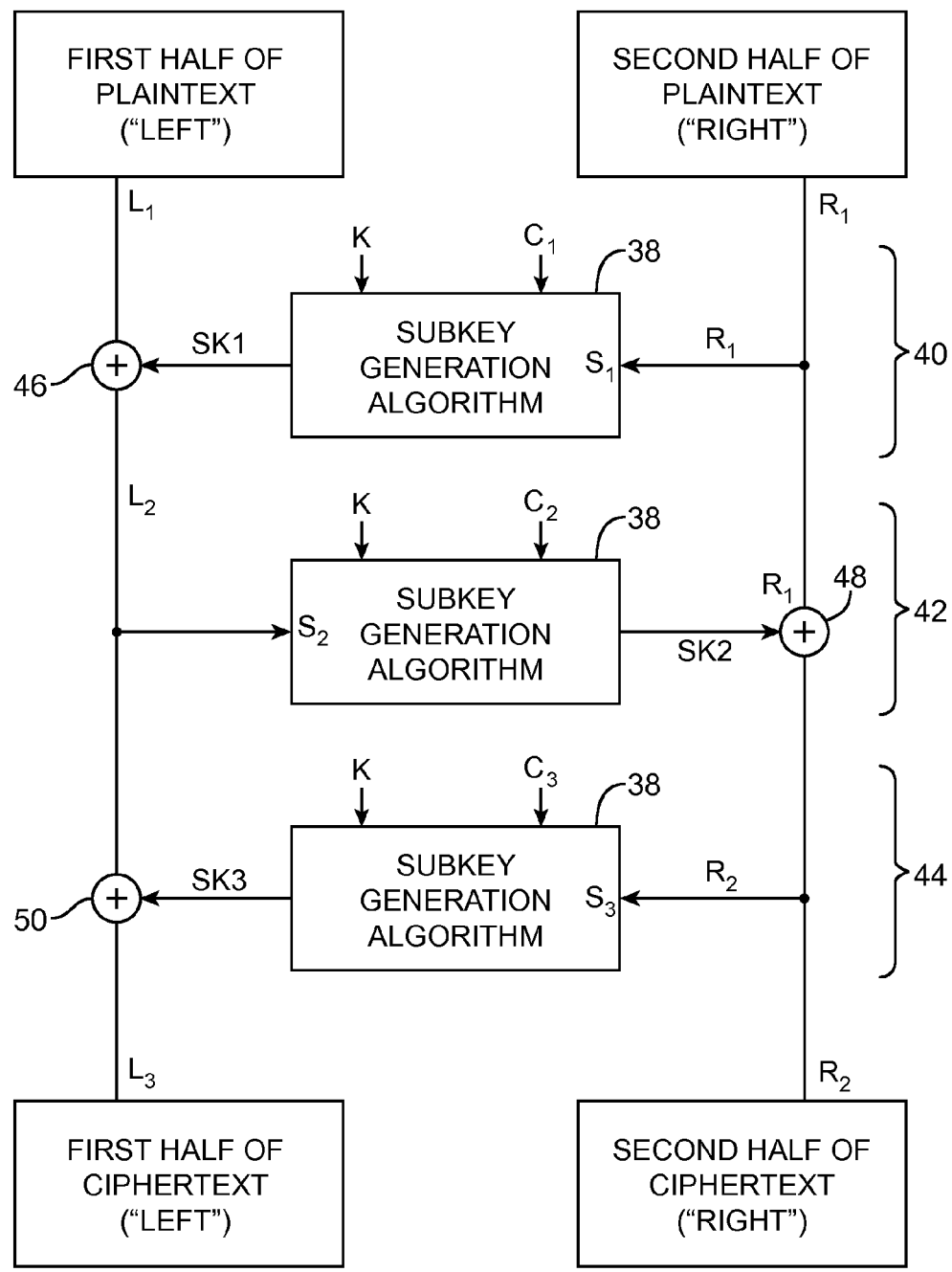
FIG. 9 is a diagram of an illustrative format-preserving block cipher that may be used during data encryption and decryption in accordance with the present invention.

In FIG. 9, the first half of the unencrypted string is labeled "$L_1$" and the second half of the unencrypted string is labeled "$R_1$". During encryption operations with encryption engine 20, the unencrypted string halves $L_1$ and $R_1$ are processed to form corresponding encrypted string halves $L_3$ and $R_2$. During decryption operations with decryption engine 22, processing flows from the bottom of FIG. 9 towards the top, so that encrypted string halves $L_3$ and $R_2$ are decrypted to produce unencrypted halves $L_1$ and $R_1$. Processing occurs in three rounds 40, 42, and 44. During encryption, the operations of round 40 are performed first, the operations of round 42 are performed second, and the operations of round 44 are performed third. During decryption, the operations of round 44 are performed first, the operations of round 42 are performed second, and the operations of round 40 are performed third.

Although shown as involving three rounds in the example of FIG. 9, the operations of FIG. 9 may, if desired, be implemented using four or more rounds. The use of a three-round block cipher is described as an example.

The block cipher structure of FIG. 9 encrypts (or decrypts) a string of a particular known size to produce an output string of the same size. The block cipher uses a subkey generation algorithm 38. The subkey generation algorithm 38 has three inputs: a key K, a constant C ($C_1$ for round 40, $C_2$ for round 42, and $C_3$ for round 44), and a string S ($S_1=R_1$ for round 40, $S_2=L_2$ for round 42, and $S_3=R_2$ for round 44).

The subkey generation algorithm 38 may be a function H' that is based on a cryptographic hash function H and that takes as an input S, C, and K. With one suitable approach, the subkey generation algorithm H' is given by equation 1.

$$H'=H(S|C|K) \tag{1}$$

In equation 1, the symbol "|" represents the concatenation function. The cryptographic hash function H is preferably chosen so that the subkey generation algorithm has a suitable cryptographic strength. Illustrative cryptographic hash functions that can be used for hash function H include the SHA1 hash function and the AES algorithm used as a hash function.

The value of the key K is the same for rounds 40, 42, and 44. The value of the constant C is different for each round. With one suitable arrangement, the constant $C_1$ that is used in round 40 is equal to 1, the constant $C_2$ that is used in round 42 is 2, and the constant $C_3$ that is used in round 44 is 3. The value of S varies in each round. In round 40, $S_1$ is equal to the first half of the unencrypted string $R_1$. In round 42, $S_2$ is equal to the $L_2$. In round 44, $S_3$ is equal to $R_2$.

In round 40, the output of the subkey generation algorithm is subkey SK1, as shown in equation 2.

$$SK1=H(S_1|C_1|K) \tag{2}$$

In round 42, the output of the subkey generation algorithm is subkey SK2, as shown in equation 3.

$$SK2=H(S_2|C_2|K) \tag{3}$$

In round 44, the output of the subkey generation algorithm is subkey SK3, as shown in equation 4.

$$SK3=H(S_3|C_3|K) \tag{4}$$

Equations 1-4 involve the use of a cryptographic hash function for the subkey generation algorithm. If desired, the subkey generation algorithm may be implemented using a cryptographic message authentication code (MAC) function. A cryptographic message authentication code function is a keyed hash function. Using a cryptographic message authentication code function, equation 1 would become H'=MACF (S|C,K), where MACF is the message authentication code function. An example of a message authentication code function is CMAC (cipher-based MAC), which is a block-cipher-based message authentication code function. The cryptographic message authentication code function AES-CMAC is a CMAC function based on the 128-bit advanced encryption standard (AES).

A format-preserving combining operation (labeled "+" in FIG. 9) is used to combine the subkeys SK1, SK2, and SK3 with respective string portions. During encryption operations, format-preserving combining operation 46 combines SK1 with string $L_1$ to produce string $L_2$. During decryption operations, format-preserving combining operation 46 combines SK1 with string $L_2$ to produce string $L_1$. Format-preserving combining operation 48 combines SK2 with string $R_1$ to produce string $R_2$ during encryption operations and combines SK2 with string $R_2$ to produce string $R_1$ during decryption operations. Format-preserving combining operation 50 is used to process subkey SK3. During encryption, format-preserving combining operation 50 combines SK3 with string $L_2$ to produce string $L_3$. During decryption, format-preserving combining operation 50 combines SK3 with string $L_3$ to produce string $L_2$.

The format-preserving combining operation+preserves the format of the strings $L_1$, $L_2$, $L_3$, $R_1$, and $R_2$ as they are combined with the subkeys SK1, SK2, and SK3. For example, the string $L_2$ that is produced by combining string $L_1$ and subkey SK1 has the same format as the string $L_1$.

The format-preserving combining operation+may be based on any suitable mathematical combining operation. For example, the function+may be addition mod x or the function+may be multiplication mod x, where x is an integer of an appropriate size (i.e., $x=y^z$, where z is equal to the length of the string S, and where y is equal to the number of possible character values for each character in the string S). If, as an example, the string S contains 16 digits (each digit having one of 10 possible values from 0 to 9), x would be $10^{16}$. If the string S contains three uppercase letters (each uppercase letter having one of 26 possible values from A to Z), x would be $26^3$. These are merely illustrative examples. The format-preserving combining function+may be any reversible logical or arithmetic operation that preserves the format of its string input when combined with the subkey.

Figure 10:
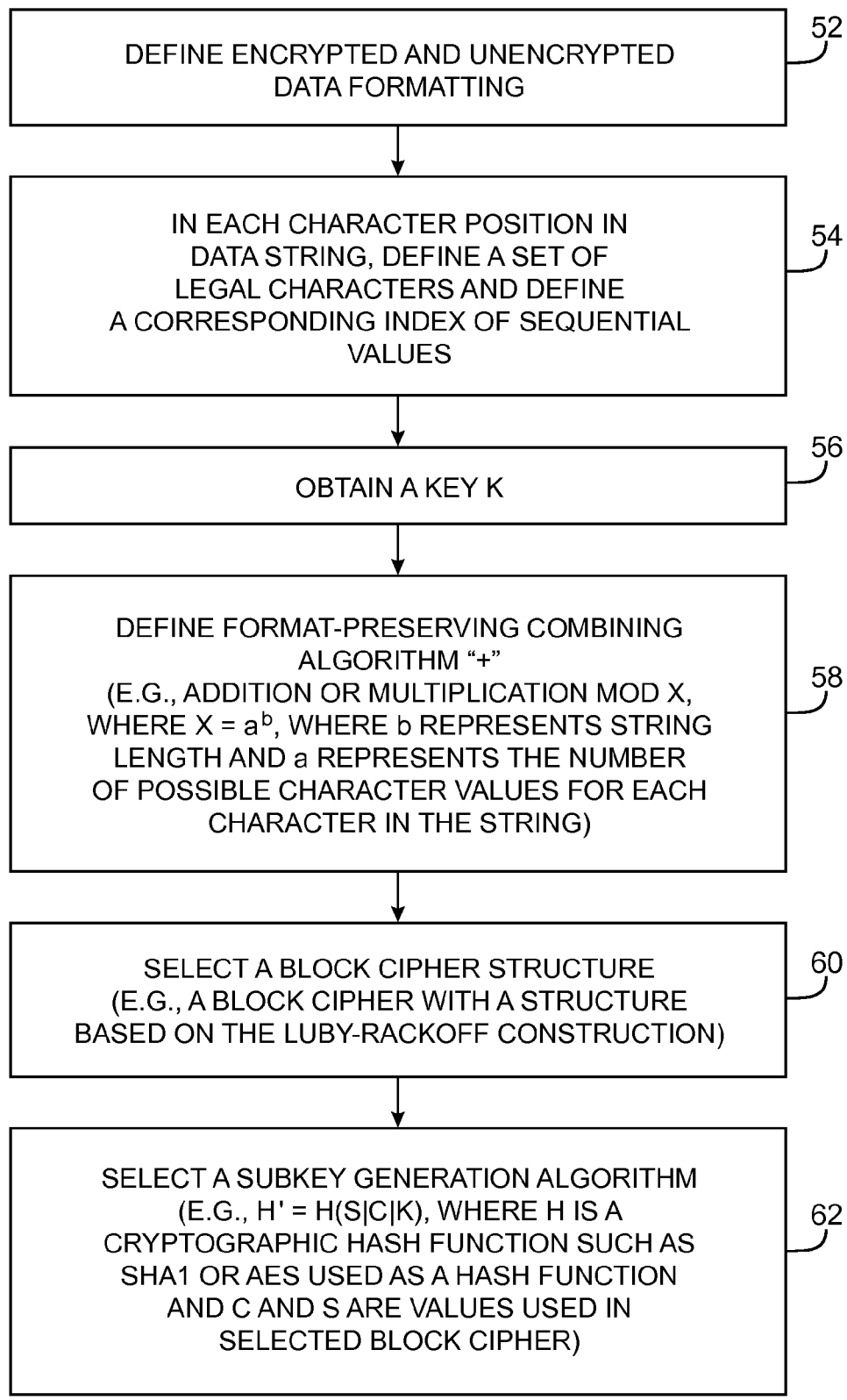
FIG. 10 is a flow chart of illustrative steps that may be used in setting up format-preserving encryption and decryption engines for use in a data processing system of the type shown in FIG. 1 in accordance with the present invention.

Illustrative steps involved in setting up the encryption engine 20 and decryption engine 22 are shown in FIG. 10. At step 52, the desired formatting to be used for the encrypted and decrypted strings is defined.

For example, unencrypted strings may be social security numbers that follow the format ddd-dd-dddd, where d is a digit from 0 to 9. The encryption engine 20 may produce corresponding encrypted strings with the identical format.

As another example, the string format may be dddd dddd dddd dddc, where d is a digit from 0 to 9 and where c is a checksum value (a digit from 0 to 9) that has been calculated from the preceding digits in the string. This type of format may be used for credit card numbers. During step 52, it is determined how the checksum digit should be treated during the encryption process.

With one suitable approach, no attempt is made to recompute a valid checksum during the encryption process and the block cipher is applied to all 16 digits of the string. In this situation, the encrypted string will contain 16 digits in four groups, just as with the unencrypted string, but the final digit will not be a checksum value.

With another suitable approach, the block cipher is applied to the leading 15 digits of the credit card number and the checksum is recomputed using the Luhn algorithm. In this situation, the final version of the encrypted string has the form dddd dddd dddd dddc.

If desired, a dummy checksum value D (i.e., a known digit value) may be added to the encrypted string, so that the final string has the form dddd dddd dddd dddD, where the symbol D represents the dummy checksum value.

Regardless of which of these forms is used for the final encrypted string, the overall encryption process implemented by the encryption engine 20 maintains the digit format of the string, because both the unencrypted and encrypted versions of the string contain 16 digits. The inclusion of additional constraints on the format of the encrypted string (e.g., requiring that the checksum value in the encrypted string be valid) may be necessary to ensure that the encrypted strings are fully compliant with legacy applications. During step 52, a user decides which of these ancillary constraints are to be included in the definition of the required format for the string.

At step 54, for each character in the string, an index mapping is created by defining a set of legal character values and a corresponding index of sequential values that is associated with the legal characters values. For example, if the legal characters for a particular character position in a string include the 10 digits (0 . . . 9) and the 26 lowercase letters (a . . . z), a suitable indexing scheme associates digits 0 through 9 with index values 1 through 10 and associates letters a through z with index values 11-36. In this index mapping, the index values that are created are all adjacent. Because there are no gaps in the indices, index value 10 is adjacent to index value 11 (in the present example). If the string contains more than one type of character, there will be more than one index mapping associated with the characters in the string.

At step 56, a value for key K is obtained. The value of K may be obtained using any suitable technique. For example, a pseudorandom number generator may be used to generate K. If desired, the pseudorandom number generator may generate K from a seed value. The seed value may be supplied manually by personnel in system 10 or may be acquired automatically.

At step 58, the format-preserving combining operation "+" is defined. As described in connection with FIG. 9, the format-preserving combining operation may be addition modulo x, multiplication modulo x, or any other suitable logical or arithmetic operation that preserves the format of the string when combining the string with a subkey and that is reversible.

At step 60, a block cipher structure is selected for the encryption engine 20 and decryption engine 22. The block cipher structure may, for example, by a Luby-Rackoff construction of the type described in connection with FIG. 9. Other suitable block cipher structures may be used if desired.

At step 62, a subkey generation algorithm is selected. Suitable subkey generation algorithms include those based on cryptographic hash functions such the SHA1 hash function and AES algorithm used as a hash function. Suitable subkey generation algorithms also include those built on cryptographic message authentication code functions such as AES-CMAC.

After performing the setup steps of FIG. 10, the encryption engine 20 and decryption engine 22 can be implemented in system 10 and sensitive data can be secured.

Figure 11:
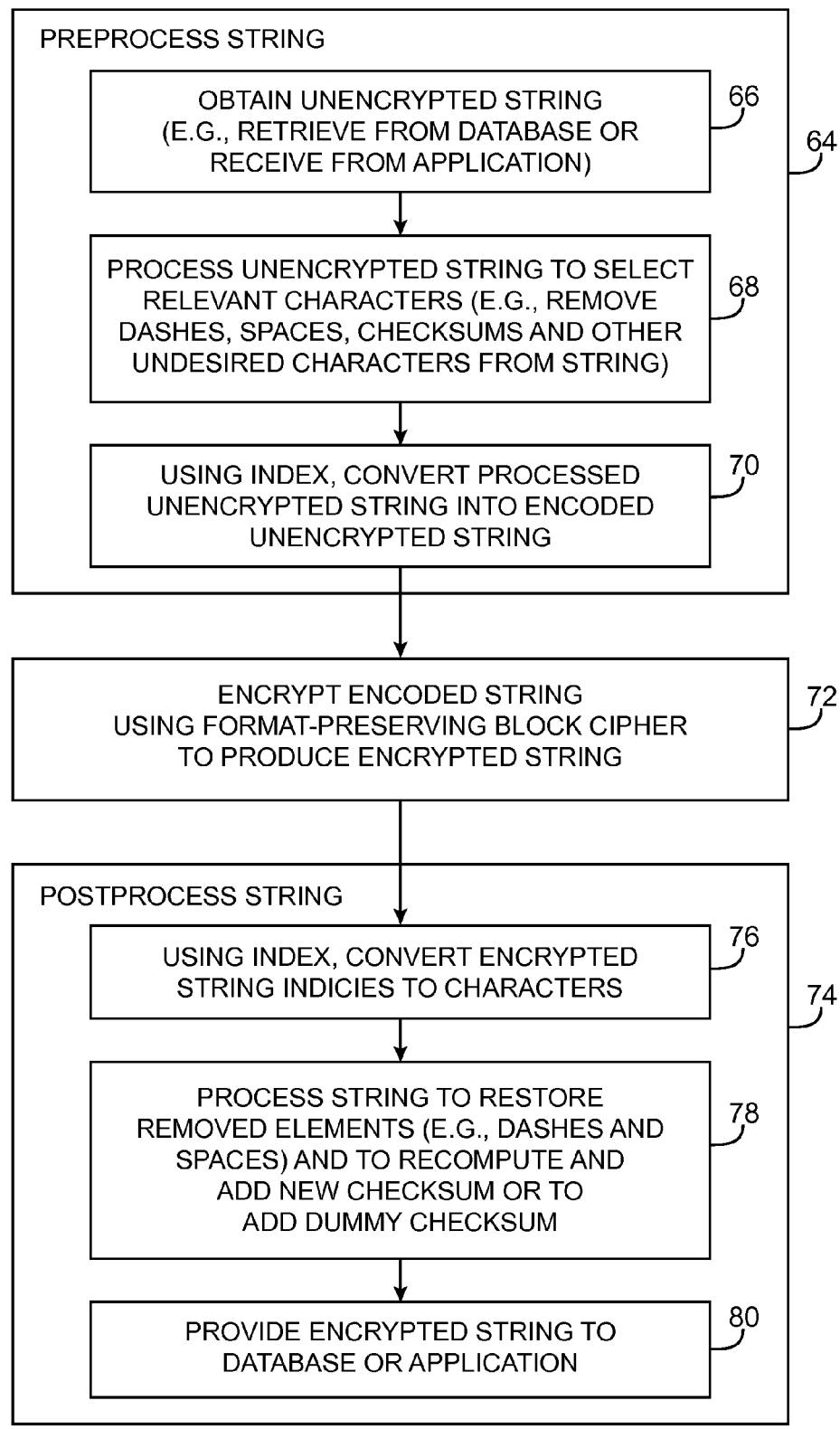
FIG. 11 is a flow chart of illustrative steps involved in using a format-preserving encryption engine to encrypt a data string in accordance with the present invention.

Illustrative steps involved in using the encryption engine 20 and decryption engine 22 when processing strings of data in system 10 are shown in FIG. 11. As described in connection with FIGS. 1 and 2, the encryption engine 20 and decryption engine 22 may be called by an application or may be part of an application 16 that is running on data processing system 10. The data strings that are encrypted and decrypted may be strings that are retrieved from and stored in fields in a database 18 (e.g., a table of the type shown in FIG. 3) or may be strings that are passed between applications 16 (e.g., applications 16 that are running on the same computing equipment 12 or that are communicating remotely over a communications network 14).

As shown in FIG. 11, the data string is preprocessed at step 64, encrypted at step 72, and postprocessed at step 74.

At step 66, the encryption engine obtains the unencrypted string. The string may be retrieved from a database 18 or received from an application 16.

At step 68, the string is processed to identify relevant characters. During step 68, dashes spaces, checksums, and other undesired characters can be removed from the string and the relevant characters in the string can be retained.

For example, if the string is a social security number that contains nine digits separated by two dashes, the string can be processed to remove the dashes. Although the dashes could be left in the string, there is no purpose in encrypting a dash character in the unencrypted string to produce a corresponding dash character in the encrypted string (as would be required to preserve the format of the entire string).

As another example, if the string being processed is a credit card number containing 16 digits and three spaces, the spaces can be removed. The checksum portion of the 16 digit credit card can be ignored by extracting the 15 leading digits of the credit card number as the relevant characters to be processed further.

At step 70, the encryption engine 20 uses the index mappings that were created during step 54 of FIG. 10 to convert the processed string (i.e., the string from which the irrelevant characters have been removed) into an encoded unencrypted string. For example, consider a license plate number in which the first, fifth, sixth, and seventh character positions contain digits (i.e., numbers from 0 through 9) and the second, third, and fourth character positions contain uppercase letters. The index mapping of FIG. 13 may be used to convert the character values in the first, fifth, sixth, and seventh character positions into corresponding index values ranging from 0 through 9. The index mapping of FIG. 14 may be used to convert the character values in the second, third, and fourth character positions into corresponding index values ranging from 0 through 25. The index values used in each index mapping are preferably sequential. Once the characters have been encoded using the sequential index values, processing can continue at step 72.

At step 72, the encryption engine 20 encrypts the encoded string using the format-preserving block cipher that was established during the operations of FIG. 10. For example, the encryption engine 20 can perform the Luby-Rackoff encryption operations described in connection with FIG. 9. During step 72, the subkey generation algorithm that was selected at step 62 of FIG. 10 and the format-preserving combining algorithm+that was defined at step 58 of FIG. 10 are used to transform the unencrypted encoded string into an encrypted encoded string.

At step 76, the same index mappings that were used during the encoding operations of step 70 are used to convert the index values of the encrypted string back into characters (i.e., characters in the legal set of character values that were defined for each character position at step 54). Decoding the encoded version of the string using the index mappings returns the string to its original character set.

At step 78, the decoded encrypted string is processed to restore elements such as dashes, spaces, and checksum values that were removed at step 68. When replacing a checksum value, a new valid checksum value can be computed from the encrypted version of the string or a dummy value can be added. If a dummy value is inserted, the dummy value can be intentionally made to be either a valid checksum or an invalid checksum. If desired, the entire string can be encrypted. With this type of arrangement, the checksum removal operation of step 68 and the checksum replacement operation of step 78 can be omitted.

By processing the string at step 78, the extraneous elements of the string that were removed at step 68 are inserted back into the string. Because the extraneous elements are reinserted into the string and because a format-preserving block cipher was used in step 72, the encrypted string that is produced will have the same format as the original unencrypted string. This allows the encrypted string to be used by applications 16 and databases 18 that require that the original string's format be used.

At step 80, the encrypted string is provided to an application 16 or database 18. Legacy applications and databases that require a specific string format will be able to accept the encrypted string. This makes it possible to secure sensitive data that would otherwise need to remain unencrypted or be encrypted only as part of a cumbersome file encryption process.

Figure 12:
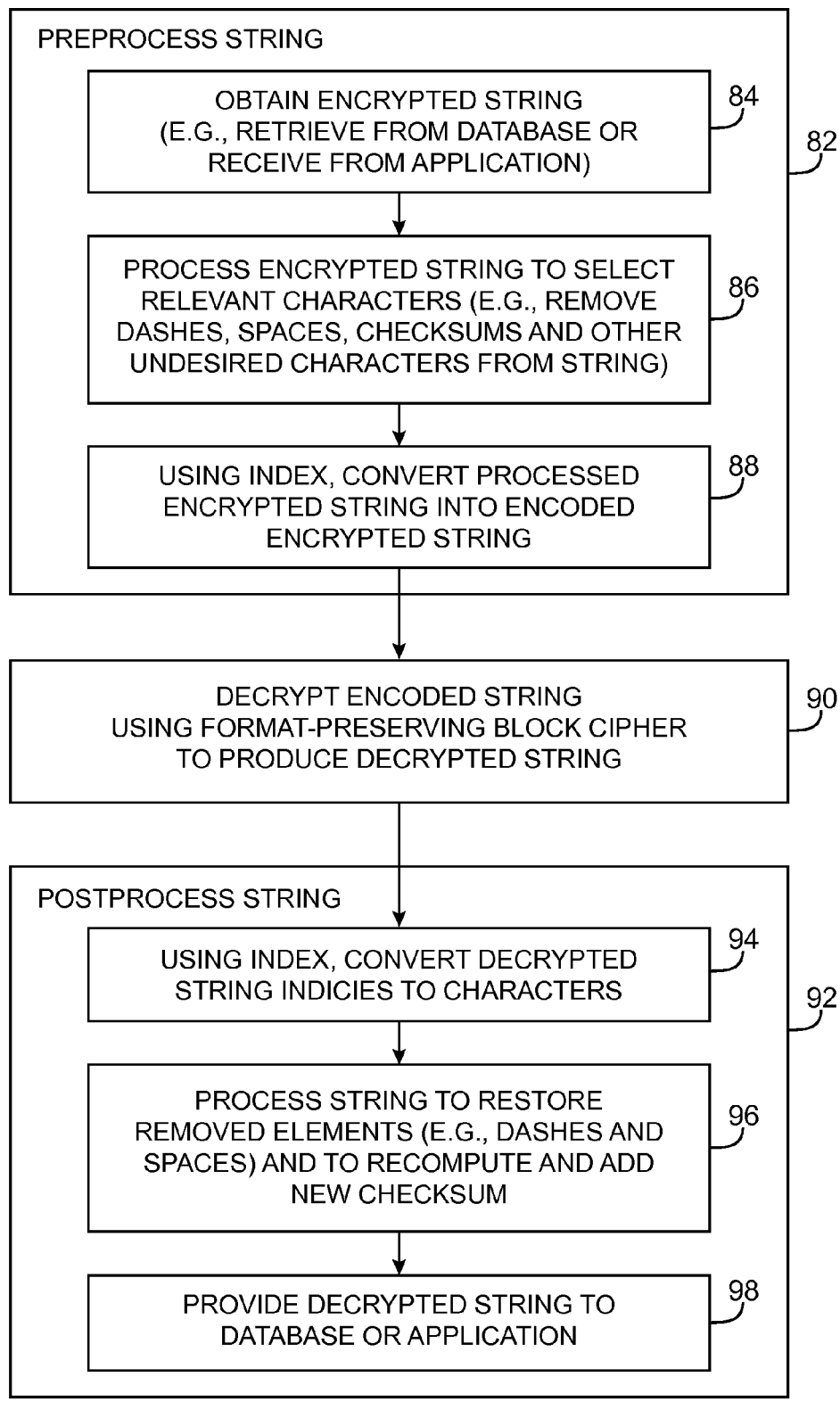
FIG. 12 is a flow chart of illustrative steps involved in using a format-preserving decryption engine to decrypt a data string in accordance with the present invention.

Illustrative steps involved in using decryption engine 22 to decrypt a string that has been encrypted using the process of FIG. 11 are shown in FIG. 12. The decryption engine 22 may be invoked by an application 16 or may be part of an application 16 that is running on data processing system 10. The data string that is being decrypted in the process of FIG. 12 may be an encrypted string that has been retrieved from a field in a database 18 (e.g., a table of the type shown in FIG. 3) or may be a string that has been retrieved from an application.

As shown in FIG. 12, the encrypted data string is preprocessed at step 82, is decrypted at step 90, and postprocessed at step 92.

At step 84, the decryption engine obtains the encrypted string. The encrypted string may be retrieved from a database 18 or received from an application 16.

At step 86, the encrypted string is processed to identify relevant characters. During step 86, dashes spaces, checksums, and other extraneous elements can be removed from the string. The relevant characters in the string are retained. The process of removing extraneous characters during step 86 is the same as that used during the processing of the unencrypted string that was performed during step 68 of FIG. 11.

If the string being decrypted is a social security number that contains nine digits separated by two dashes, the encrypted string can be processed to remove the dashes.

As another example, if the string being processed during step 86 is a credit card number containing 16 digits and three spaces, the spaces can be removed prior to decryption. The checksum digit of the 16 digit credit card can be ignored by extracting the 15 leading digits of the encrypted credit card number as the relevant characters to be decrypted.

At step 88, the decryption engine 20 uses the index mappings that were defined at step 54 of FIG. 10 and that were used during the encryption operations of FIG. 11 to convert each of the characters of the processed encrypted string (i.e., the encrypted string from which the extraneous characters have been removed) into an encoded encrypted string. If, as an example, the legal set of characters associated with the first character of the encrypted string is defined as the set of 10 digits, a 10 digit index may be used to encode the first character of the encrypted string. If the legal set of characters associated with the second character of the encrypted string is defined as the set of 26 uppercase letters, a 26-digit index may be used to encode the second character of the encrypted string. During step 88, each character of the string is converted to a corresponding index value using an appropriate index mapping, as described in connection with FIGS. 13 and 14.

At step 90, the encoded version of the encrypted string is decrypted. The decryption engine 22 decrypts the string using the format-preserving block cipher that was established during the operations of FIG. 10. For example, the decryption engine 20 can perform the Luby-Rackoff decryption operations described in connection with FIG. 9. During step 90, the subkey generation algorithm that was selected at step 62 of FIG. 10 and the format-preserving combining algorithm+that was defined at step 58 of FIG. 10 are used to transform the encrypted encoded string into a decrypted encoded string.

At step 94, the index mappings that were used during the encoding operations of step 88 are used to convert the index values of the decrypted string back into their associated characters (i.e., characters in the legal set of character values that were defined for each character position at step 54). This returns the decrypted string to its original character set. In strings that contain more than one different type of character, multiple different index mappings are used.

At step 96, the decoded decrypted string is processed to restore elements such as dashes, spaces, and checksum values that were removed at step 88. When replacing a checksum value, a new valid checksum value is computed from the decrypted version of the string. This ensures that the decrypted version of the string will be returned to its original valid state.

During the string processing operations of step 96, the extraneous elements of the string that were removed at step 88 are inserted back into the string. This restores the string to its original unencrypted state (i.e., the state of the string when obtained at step 66 of FIG. 11).

At step 98, the decrypted string is provided to an application 16 or database 18.

By incorporating format-preserving encryption and decryption engines 20 and 22 into data processing system 10, legacy applications and databases and other applications and databases can be provided with cryptographic capabilities without disrupting their normal operation.

The foregoing is merely illustrative of the principles of this invention and various modifications can be made by those skilled in the art without departing from the scope and spirit of the invention.

What is claimed is:

1. A method for encrypting a data string to produce a corresponding encrypted data string using a format-preserving block cipher on a data processing system, comprising:
   wherein the data string contains characters and has a format specifying a legal set of character values for each of the characters of the data string, wherein the data string contains a first string of characters that has a first format specifying a legal set of character values for each of the characters of the first string and contains a second string of characters that has a second format specifying a legal set of character values of each of the characters of the second string;
   with a format-preserving combining operation, combining a first subkey with the first string of characters while preserving the first format of the first string of characters; and
   with the format-preserving combining operation, combining a second subkey with the second string of characters while preserving the second format of the second string of characters.

2. The method defined in claim 1, further comprising: before combining the first subkey with the first string of characters, encoding the data string using at least one index of sequential index values each of which corresponds to a respective one of the character values in the legal set of character values for the characters of the data string.

3. The method defined in claim 2, further comprising: using the index, decoding the encrypted data string to produce a decoded encrypted data string with characters having character values in the legal set of character values.

4. The method defined in claim 3 further comprising:
   generating the first and second subkeys using a subkey generation algorithm; and
   receiving a key as an input with the subkey generation algorithm.

5. The method defined in claim 4 wherein generating the first and second subkeys using the subkey generation algorithm comprises using a cryptographic hash function to generate the first and second subkeys.

6. The method defined in claim 4 wherein generating the first and second subkeys using the subkey generation algorithm comprises using a cryptographic message authentication code function to generate the first and second subkeys.

7. The method defined in claim 1 further comprising decrypting the encrypted string using a subkey generation algorithm that generates the first and second subkeys and using addition mod x, where x is an integer.

8. The method defined in claim 1 wherein at least one of the legal sets of character values of the data string comprises letters.

9. The method defined in claim 1 wherein, for at least one of the characters in the data string, the legal set of character values for that character comprises ten character values.

10. The method defined in claim 1 wherein the format-preserving combining operation comprises addition mod x, where x is an integer.

11. The method defined in claim 1, wherein combining the first subkey with the first string of characters while preserving the first format of the first string of characters produces a corresponding third string of encrypted characters in the first format, the method further comprising:
   using the format-preserving combining operation to combine a third subkey with the third string of encrypted characters while preserving the first format of the third string of encrypted characters.

12. The method defined in claim 11, wherein combining the second subkey with the second string of characters while preserving the second format of the second string of characters produces a corresponding fourth string of characters in the second format, the method further comprising:
   using the format-preserving combining operation to combine a fourth subkey with the fourth string of characters while preserving the second format of the fourth string of characters.

* * * * *